(12) United States Patent
Kim

(10) Patent No.: US 6,467,143 B1
(45) Date of Patent: Oct. 22, 2002

(54) AUTOMATIC DOOR PANEL PRODUCING APPARATUS

(75) Inventor: Hong-Guil Kim, Inchon (KR)

(73) Assignee: Nam & Nam, Seoul (KR)

( * ) Notice: Subject to any disclaimer, the term of this patent is extended or adjusted under 35 U.S.C. 154(b) by 19 days.

(21) Appl. No.: 09/597,647

(22) Filed: Jun. 20, 2000

(30) Foreign Application Priority Data

Dec. 30, 1999 (KR) .............................................. 99-65687

(51) Int. Cl.$^7$ ................................................ B23P 23/04
(52) U.S. Cl. ........................ 29/33 R; 264/46.5; 226/26; 226/45
(58) Field of Search ................................ 29/417, 33 R, 29/407.01; 264/46.5, 261, 46.2; 226/45, 26, 42

(56) References Cited

U.S. PATENT DOCUMENTS

| | | | |
|---|---|---|---|
| 3,177,749 A | * | 4/1965 | Best et al. |
| 4,033,492 A | * | 7/1977 | Imai |
| 4,186,632 A | * | 2/1980 | Leslie et al. |
| 4,887,343 A | * | 12/1989 | Ohishi |
| 5,679,381 A | | 10/1997 | Anderson et al. |
| 5,713,533 A | * | 2/1998 | Nordlof et al. |
| 5,827,458 A | * | 10/1998 | Meadows |

* cited by examiner

Primary Examiner—S. Thomas Hughes
Assistant Examiner—Steven Blount
(74) Attorney, Agent, or Firm—McDonnell Boehnenn Hulbert & Berghoff

(57) ABSTRACT

An apparatus and method for automatically producing door panels in a single line in order to enable continuous production are provided. In the apparatus, a first uncoiler supplies the wound inner plate material. A first leveler regulates a flatness of the inner plate material. A press forms a pattern on the inner plate material. A marking device marks a cutting position on the inner plate material from the presser. A bend controller controls a bend of the inner plate material from the marking device. A second uncoiler supplies an outer plate material. A second leveler regulates a flatness of the outer plate material supplied from the second uncoiler. A roll forming device roll-forms both edges of the inner and outer plate materials. A heater preheats the inner and the outer plate materials. An injector injects insulated material between the inner and outer plate materials. A marking sensor senses the mark on the inner plate material and outputs a sensing signal. A cutter cuts the door panel at a fixed size according to the sensing signal. According to the apparatus, the inner and outer plate materials are processed while continuously passing through each device so that the door panel is completed.

11 Claims, 14 Drawing Sheets

AUTOMATIC DOOR PANEL PRODUCING APPARATUS

BACKGROUND OF THE INVENTION

1. Field of the Invention

The present invention relates to an automatic door panel producing apparatus and method, more particularly to an automatic door panel producing apparatus and method for producing door panels in a single line in order to enable continuous production.

2. Prior Arts

In general, a door panel is used in doors of houses, garages, or factories etc. The door panel has various patterns on its surface according to its use. Polyurethane or glasswool is inserted between the inner and outer metal plates of the door panel. The polyurethane or fiberglass has soundproofing and heatproofing functions. The polyurethane(pu) or fiberglass has a fixed thickness according to its use. The polyurethane insulated door panel is produced by a material supply process, a flat regulating process, a material feeding process, a pressing process, a cutting process, a forming process, a hot pressing process and a pu pouring process, and a unloading process. The material supply process is a process which supplies material via an uncoiler. The flat regulating process is a process which regulates the flatness of the material through a leveler. The material feeding process is a process which advances the material. The cutting process is a process which cuts the material by a regular size. The pressing process is a process which forms patterns on the material. The forming process folds over the edges of the material. The hot pressing process and pu pouring process, and unloading process should be performed at the hot press process.

U.S. Pat. No. 5,679,381 (issued to Per Just Anderson et al.) discloses a method and apparatus for manufacturing articles of manufacture, particularly containers and packaging materials from hydraulically settable sheets.

FIG. 1 shows a conventional door panel producing apparatus. As shown in FIG. 1, the conventional door panel producing apparatus includes an uncoiler 102, a leveler 104, a materiel feeder 106, a cutter 108, a press 110, a roll forming device 112, and a hot press 114.

The uncoiler 102 supplies a wound material. The leveler 104 regulates flatness of the material. The material feeder 106 forwards the material having regulated flatness by a fixed length. The cutter 108 trims the fed material by the fixed length. The press 110 forms a pattern on the cut material. The roll forming device 112 forms over edges of the material having the formed pattern. The hot press 114 pours polyurethane(pu) between the inner and outer plate materials and cures the poured polyurethane(pu).

An operation of the conventional door panel producing device will be described referring to FIG. 1. When the material is supplied from the uncoiler 102 to the leveler 104, the leveler 104 regulates a flatness of the supplied material. The material feeder 106. forwards the material by a fixed length. And the cutter 108 cuts the material by a fixed length. The cut material is transferred to the press 110 by means of a conveyer 116. The press 110 forms a pattern on the material. The material from the press 110 is transferred to the roll forming device 112 by means of a conveyer 118. The roll forming device 112 folds over edges of the material from the press 110.

After performing the process, a worker loads inner and outer plates of the door panel on a carriage 120 so that the inner and outer plates of the door panel are inserted into the hot press 114. The worker joins the inner and outer materials in fixed thickness by means of a reinforced material(not shown), and piles the joined inner and outer materials on the hot press 114 in layers. The worker then pours the polyurethane between the inner and outer materials. After a predetermined curing time, the polyurethane has solidified, the worker unloads it and loads the door panel on the carriage 102 to thereby complete production of the door panel.

However, the conventional door panel producing apparatus has problems as follows. Since the pressing process and the roll forming process proceed after the cutting of the materials, the entire process is not continuous. And since the combining process joining the inner and outer materials is manually performed, the completed door panel has poor quality. Also, since the process which joins the inner plate to the outer plate or the process which loads the completed door panel on the carriage is manually performed, working hours and the number of workers are excessive and, accordingly the production cost of the door panel is also too high.

SUMMARY OF THE INVENTION

It is an object of the present invention to provide a door panel automatic producing apparatus and method capable of continuously performing all processes in manufacturing a door panel.

In order to achieve this object, the present invention, there is provided an automatic door panel producing apparatus, said apparatus comprising;

a first uncoiler being wound around an inner plate material forming an inner surface of a door panel for supplying the wound inner plate material;

a first leveler for regulating a flatness of the inner plate material supplied from the first uncoiler;

a presser for forming a pattern on the inner plate material fed from the first leveler;

a marking device for marking a cutting position on the inner plate material from the presser;

a bend controller for controlling a bend of the inner plate material from the marking device;

a second uncoiler being wound around an outer plate material forming an outer surface of the door panel for supplying the wound outer plate material;

a second leveler for regulating a flatness of the outer plate material supplied from the second uncoiler;

a roll forming device for roll-forming both edges of the inner and outer plate materials from the bend controller and second leveler;

a heater for preheating the inner and the outer plate materials from the roll forming device;

an injector for injecting insulated material between the inner and outer plate materials preheated by the heater;

a marking sensor for sensing the mark on the inner plate material from the injector and outputting a sensing signal; and a cutter for cutting the door panel at a fixed size according to the sensing signal from the marking sensor.

Preferably, the bend controller includes a sensing device for sensing a bend of the inner plate material from the marking device; a support member for supporting the inner plate material from the sensor; and a guide member for guiding the inner plate material supported by the support member.

Also, there is provided an automatic door panel automatic producing method, said method comprising the steps of;

i) supplying an inner plate material for a door panel;

ii) regulating a flatness of the inner plate material supplied in step i);

iii) forming a pattern on the inner plate material regulated in step ii);

iv) marking a cutting position on the inner plate material having a formed pattern in step iii);

v) controlling a bend of the inner plate material having a marked cutting position in step iv);

vi) supplying an outer plate material for the door panel;

vii) regulating a flatness of the outer plate material supplied in step vi);

viii) folding over both edges of the inner and outer plate materials;

ix) preheating the inner and outer plate materials folded in step viii);

x) injecting a blowing agent between the inner and outer plate materials preheated in step ix);

xi) sensing the mark on the inner plate material and outputting a sensing signal; and xii) trimming the inner and outer plate materials at a set size according to the sensing signal.

According to the present invention, the inner and outer plate materials are processed while continuously passing through each device so that a door panel is completed. Therefore, the number of workers and working hours is reduced thereby improve productivity.

BRIEF DESCRIPTION OF THE DRAWINGS

The above object, and other features and advantages of the present invention will be apparent by describing the preferred embodiment of the present invention hereinafter with reference to the accompanying drawings in which:

FIG. 8A is an enlarged detail for schematically showing portions of the supporting body shown in FIG. 8;

DESCRIPTION OF THE PREFERRED EMBODIMENT

The preferred embodiment of the present invention will be described below in detail with reference to the accompanying drawings.

Figure 1:
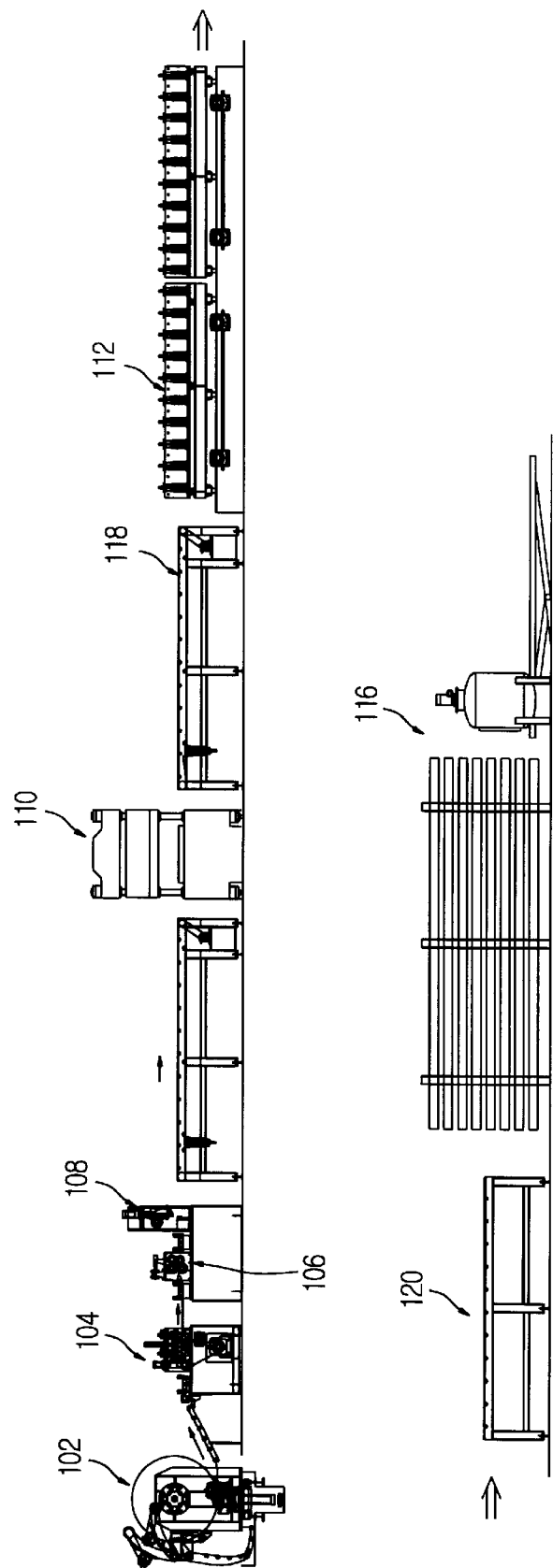
FIG. 1 is a schematic elevation for showing a configuration of a conventional door panel producing apparatus.
Figure 2:
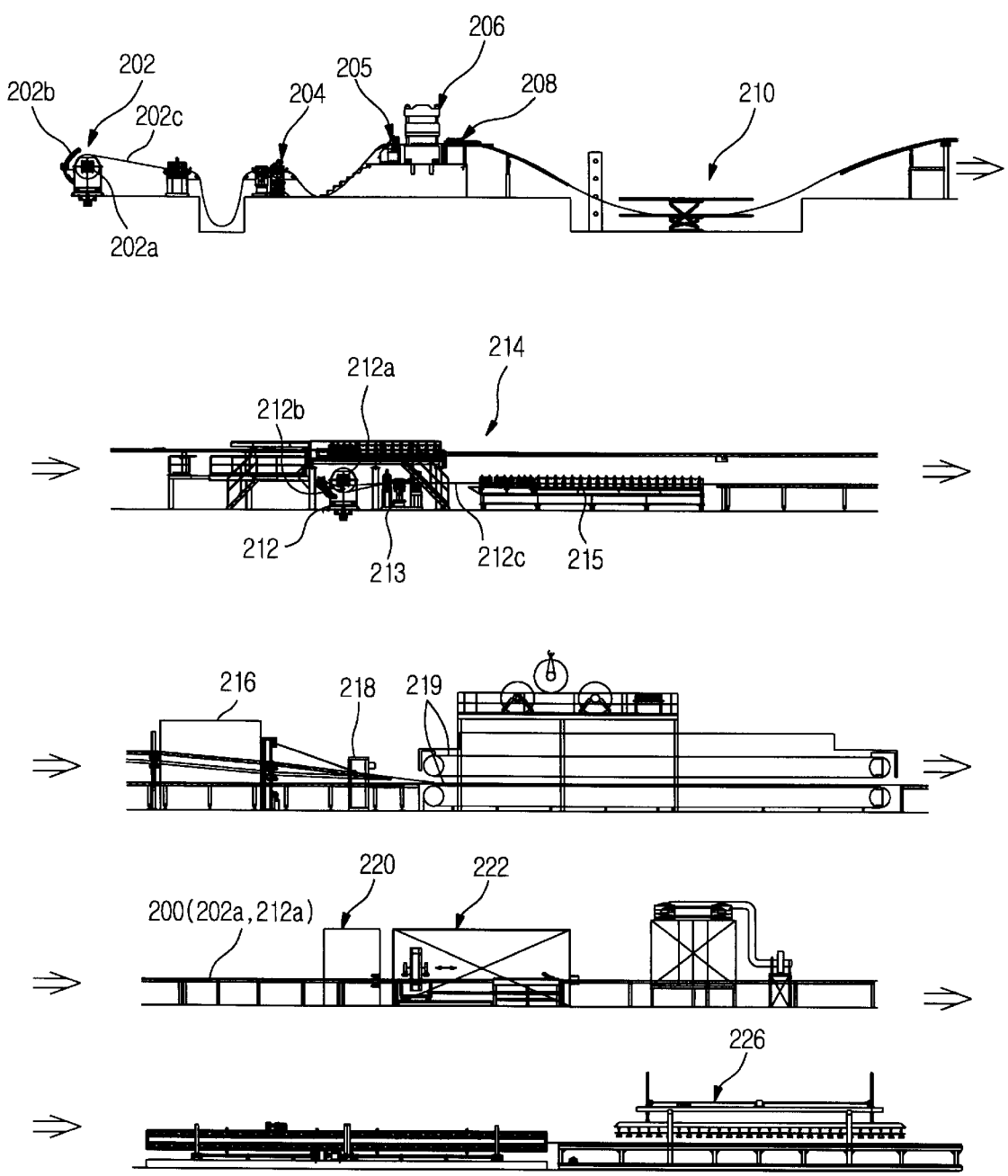
FIG. 2 is a schematic elevation for showing a configuration of an automatic door panel producing apparatus according to the preferred embodiment of the present invention.

FIG. 2 shows a configuration of a an automatic door panel producing apparatus 20 according to the preferred embodiment of the present invention. The automatic door panel producing apparatus 20 includes a first uncoiler 202, a first leveler 204, a feeder 205, a press 206, a marking device 208, a bend controller 210, a second uncoiler 212, a second leveler 213, a roll forming device 214, a heater 216, an injector 218, a marking sensor 220, a cutter 222, and a hoist 224.

Figure 3:
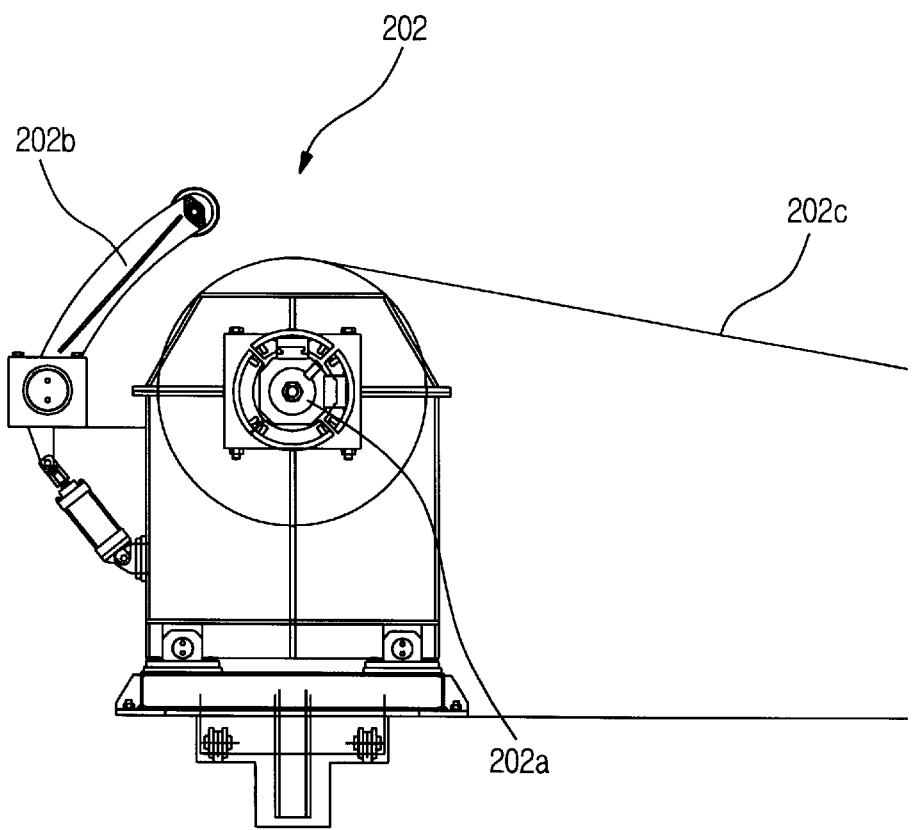
FIG. 3 is an enlarged detail for showing the first uncoiler shown in FIG. 2.

FIG. 3 is an enlarged detail for showing the first uncoiler 202 shown in FIG. 2. The first uncoiler 202 supplies an inner plate of a door panel. The first uncoiler 202 includes a winding member 202a and an urgent rotation preventing section 202b. The winding member 202a is wound around an inner plate material 202c. The inner plate material 202c forms an inner plate of a door panel(not shown) is wound around the first uncoiler 202. When the first uncoiler 202 operates, the inner plate material 202c is uncoiled from the first uncoiler 20e by a clutch(not shown). A first over rotation preventing section 202b is pivotally mounted at a side of the first uncoiler 202. The first over rotation preventing section 202b prevents the inner plate material 202c from being suddenly rotated.

Figure 4:
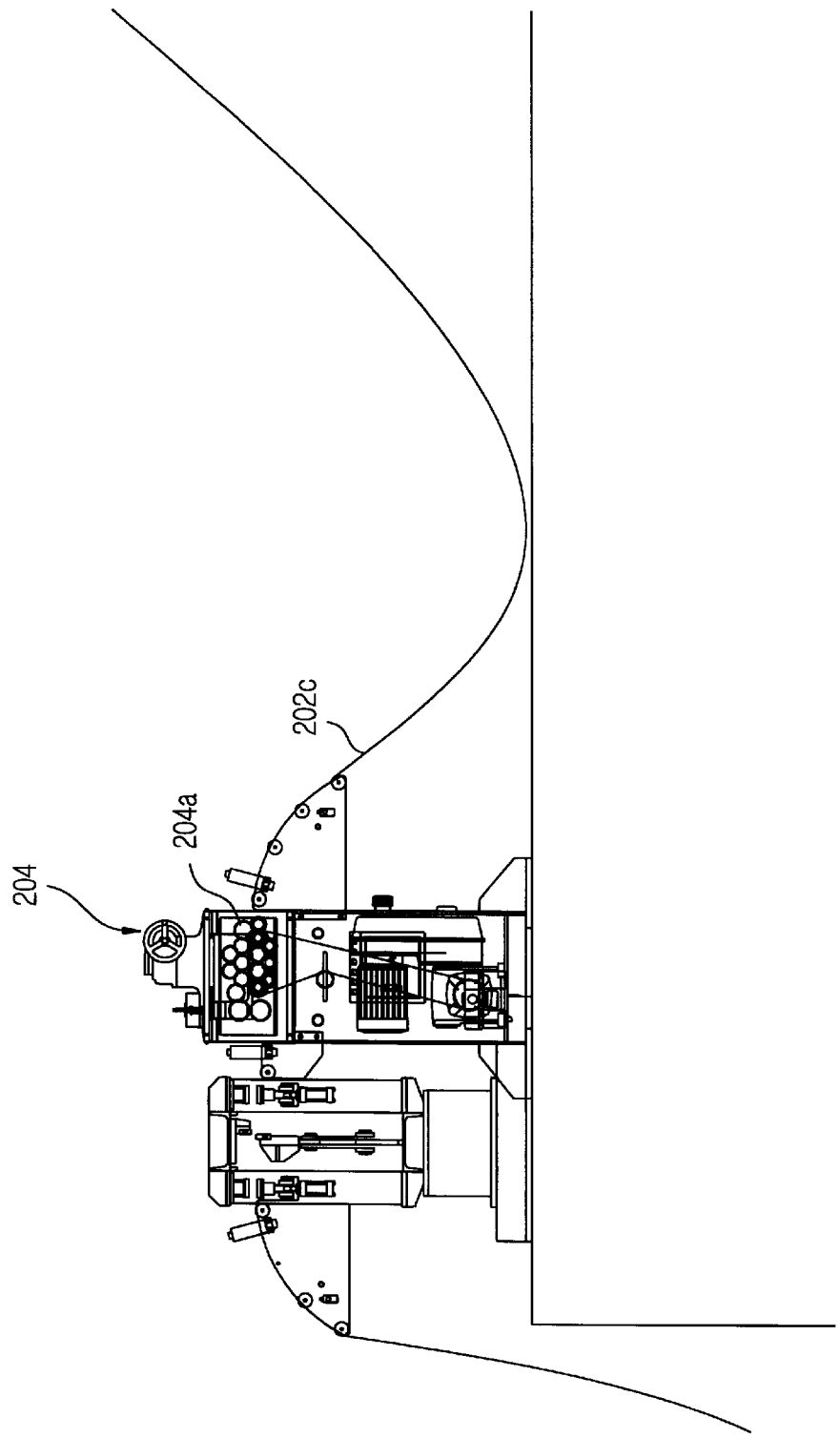
FIG. 4 is an enlarged detail for showing the leveler shown in FIG. 2.

FIG. 4 is an enlarged detail for showing the leveler shown in FIG. 2. As shown in FIG. 4, the first leveler 204 regulates a flatness of the inner plate material 202c from the first uncoiler 202. The leveler 204 has a plurality of rollers 204a mounted therein wherein the inner plate material 202c is passed between the rollers 204a.

Figure 5:
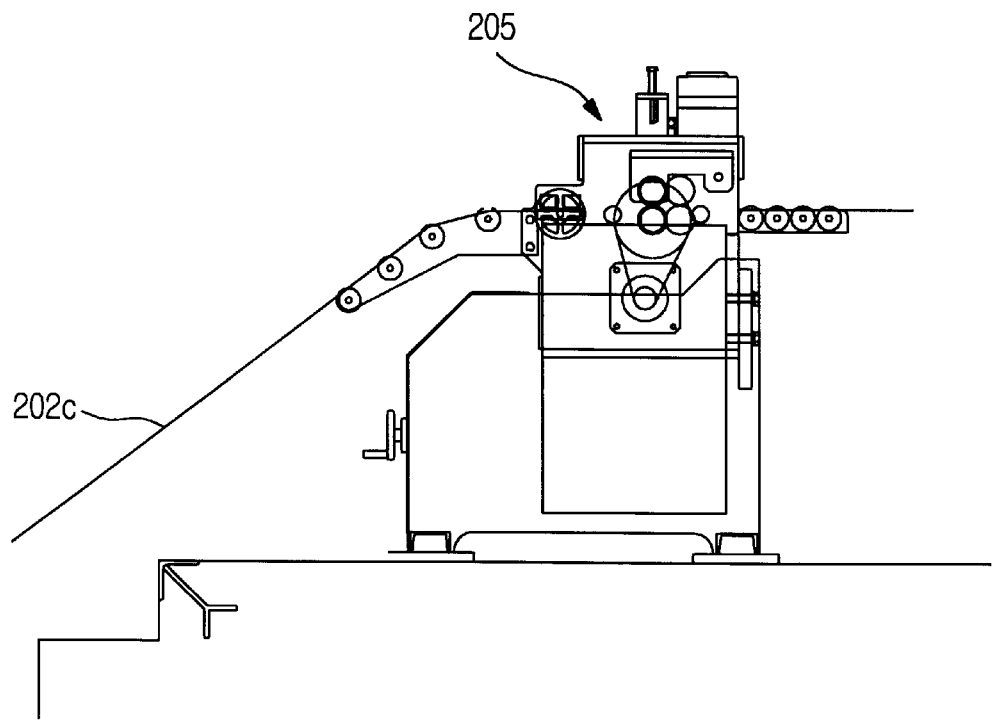
FIG. 5 is an enlarged detail for showing the feeder shown in FIG. 2.

FIG. 5 is an enlarged detail for showing the first feeder 205 shown in FIG. 2. As shown in FIG. 5, the first feeder 205 forwards the inner plate material 202c from the leveler 204 by a determined distance wherein a flatness of the inner plate material 202c has been regulated.

Figure 6:
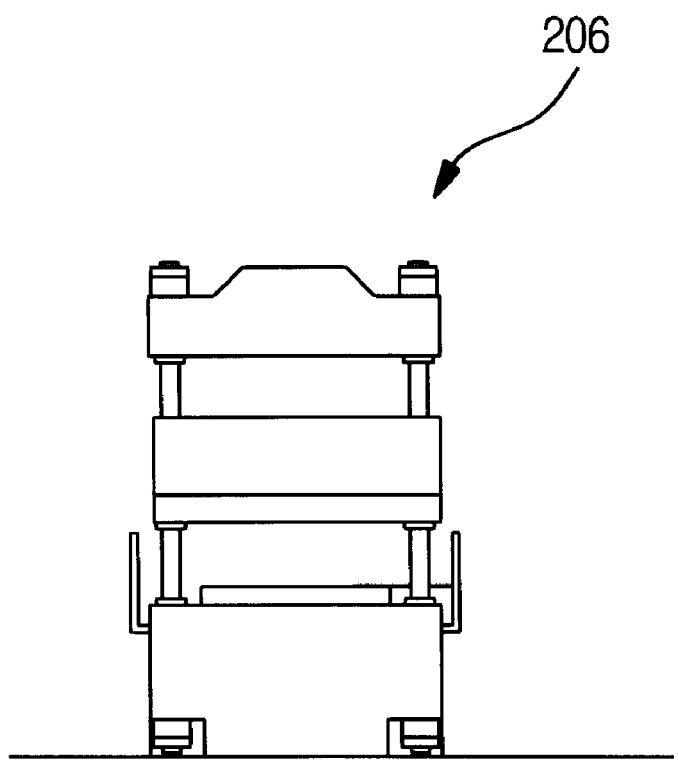
FIG. 6 is an enlarged detail for showing the presser shown in FIG. 2.

FIG. 6 is an enlarged detail for showing the presser 208 shown in FIG. 2. As shown in FIG. 6, the press 206 forms a pattern on the inner plate material 202c fed from the first feeder 205. That is, the presser 206 operates in conjunction with the first feeder 205, while the feeding speed of the first feeder 205 is controlled by the sensing part 210a.

Figure 7:
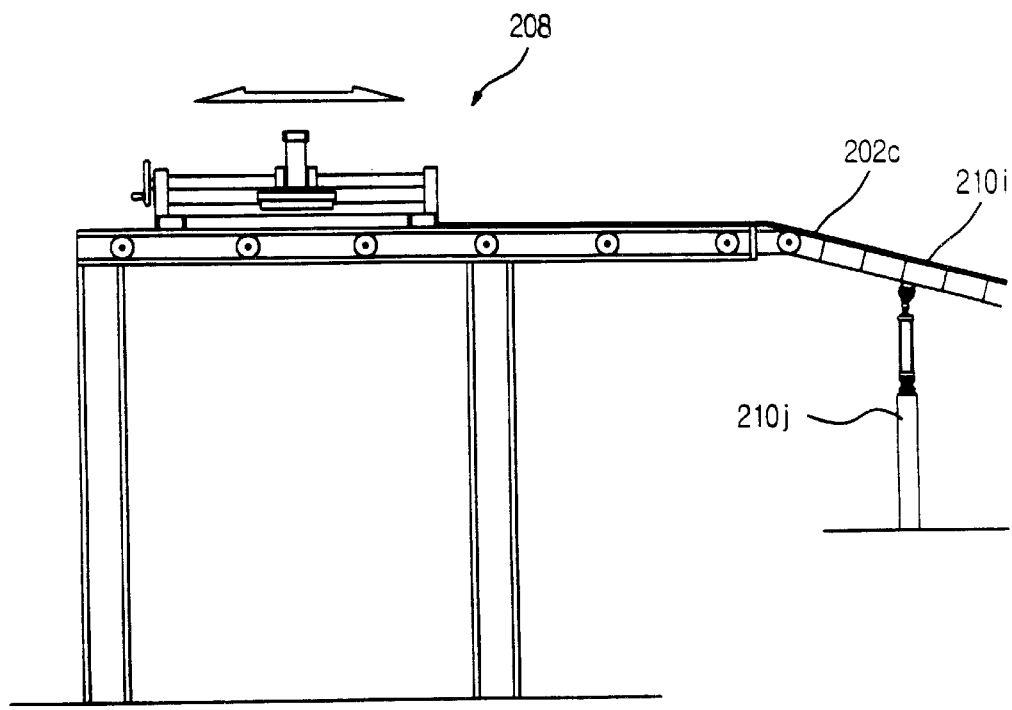
FIG. 7 is an enlarged detail for showing the marking device shown in FIG. 2.

FIG. 7 is an enlarged detail for showing the marking device 208 shown in FIG. 2. As shown in FIG. 7, the marking, device 208 marks a cutting position on the inner plate material 202c from the presser 206. The marking device 208 paints or punches holes(not shown) on the inner plate material 202c. The marking part 208 is movable to the front, rear, right, and left directions by a handle.

Figure 8:
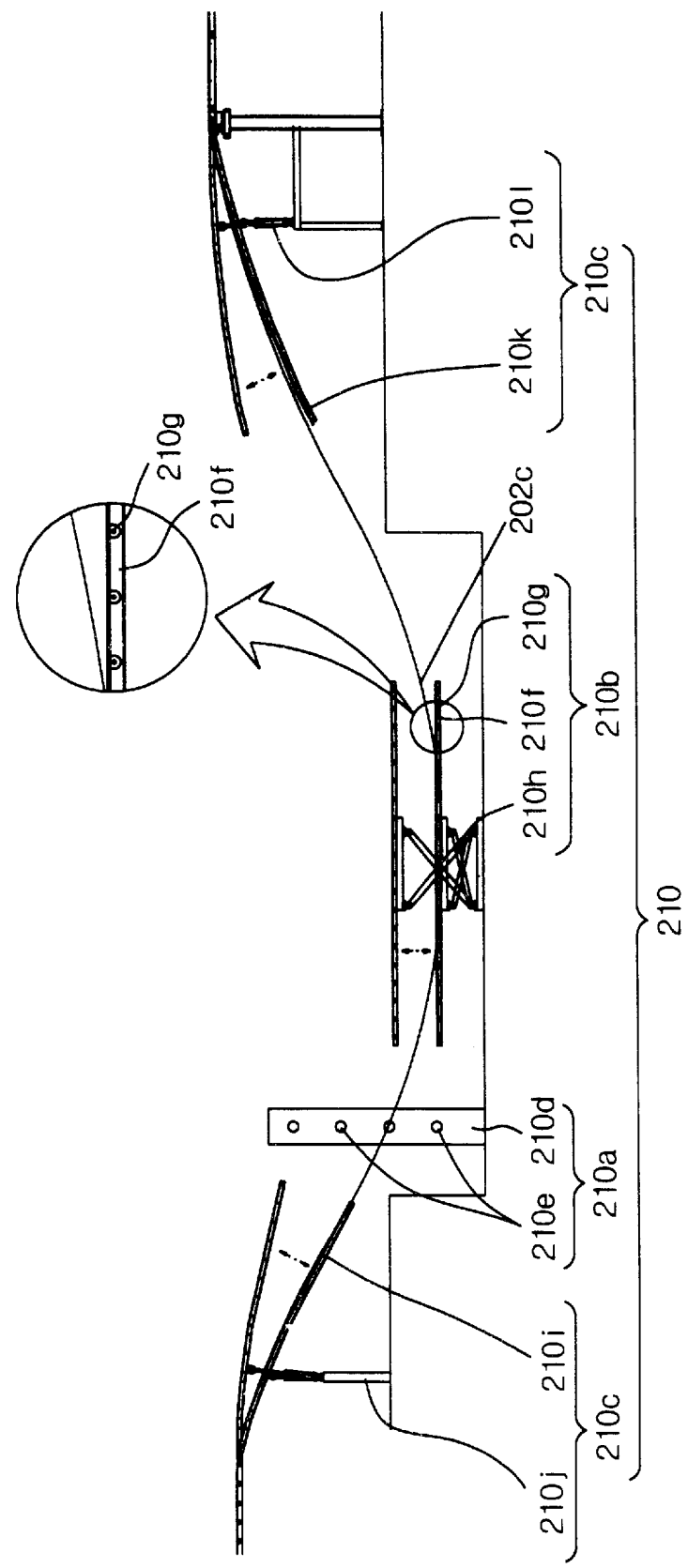
FIG. 8 is an enlarged detail for showing the bend controller shown in FIG. 2.

FIG. 8 is an enlarged detail for showing the bend controlled shown in FIG. 2. As shown in FIG. 8, the bend controller 210 controls a bend of the inner plate material 202c from the marking part 208. The bend controller 210 includes a sensing device 210a, a support member 210b, and a guide member 210c. The sensing device 210a includes a pair of supporting members 210d and a plurality of sensors 210e. The pair of supporting members 210d are placed on each side of the inner plate material 202c. The plurality of sensors 210e are vertically mounted on opposite surfaces of each of supporting members 210d at regular intervals.

The support member 210b includes a supporting body 210f and a height controller 210h. The supporting body 210f is mounted on guiding rollers contacting a bottom surface of the bent inner plate material 202c from the sensing device 210a. The height controller 210h is mounted on the bottom surface of the supporting body 210f. A level of the height controller 210h is controlled.

The guide member 210c includes a first guiding plate 210i, a first variable supporting body 210j, a second guiding plate 210k, and a second variable supporting body 210l.

The first guiding plate 210i is hinged to a rear end of the marking device 208. The first variable supporting body 210j supports the first guiding plate 210i. The second guiding plate 210k is hinged to a front end of the roll forming device 214 and faces to the first guiding plate 210i. The second variable supporting body 210l supports the second guiding plate 210k and faces the first variable supporting body 210j.

Figure 9:
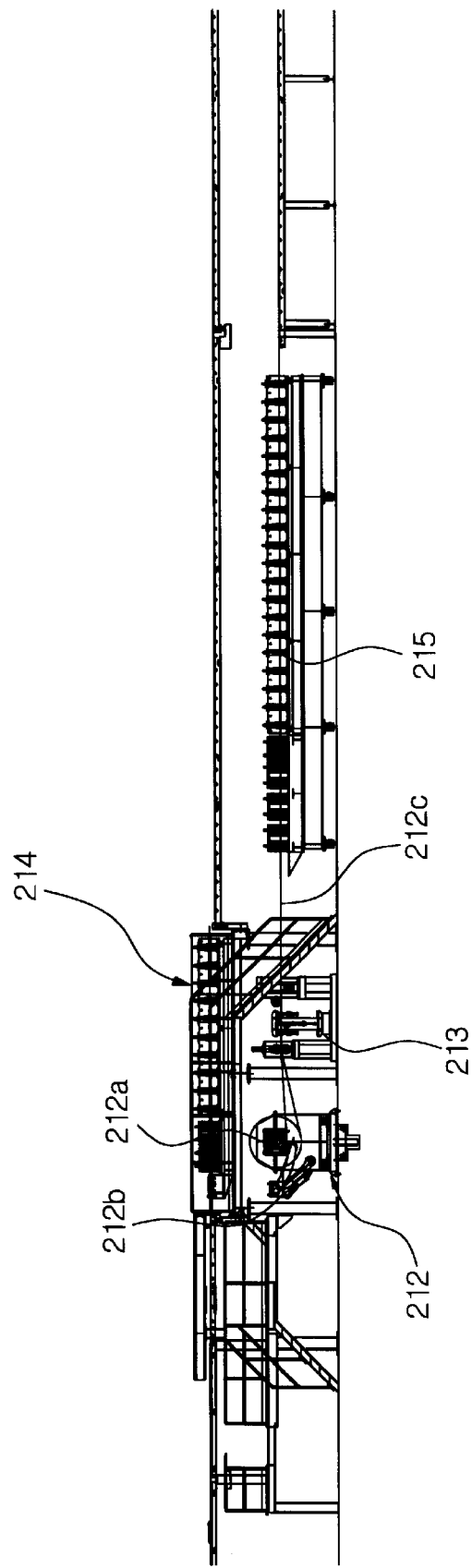
FIG. 9 is an enlarged detail for showing the second uncoiler and folding device shown in FIG. 2.

FIG. 9 is an enlarged detail for showing the second uncoiler 212, second leveler 213, roll forming device 214, second feeder 215 shown in FIG. 2.

The second uncoiler 212 is wound around an outer plate material 214c which forms an outside surface of the door panel. The second uncoiler 212 includes a second winding member 212a and a second urgent rotation preventing section 212b. The second winding member is wound around the outer plate material 212c. The second urgent rotation preventing section 212b is pivotably mounted on a side of the second uncoiler 212 and prevents the outer plate material 212c from suddenly being rotated.

The second leveler 213 regulates the flatness of the outer plate material 212c supplied from the second uncoiler 212.

The roll forming device 214 roll-forms over both edges of the inner and outer plate materials 202c and 212c from the bend controller 210 and second leveler 213.

Figure 10:
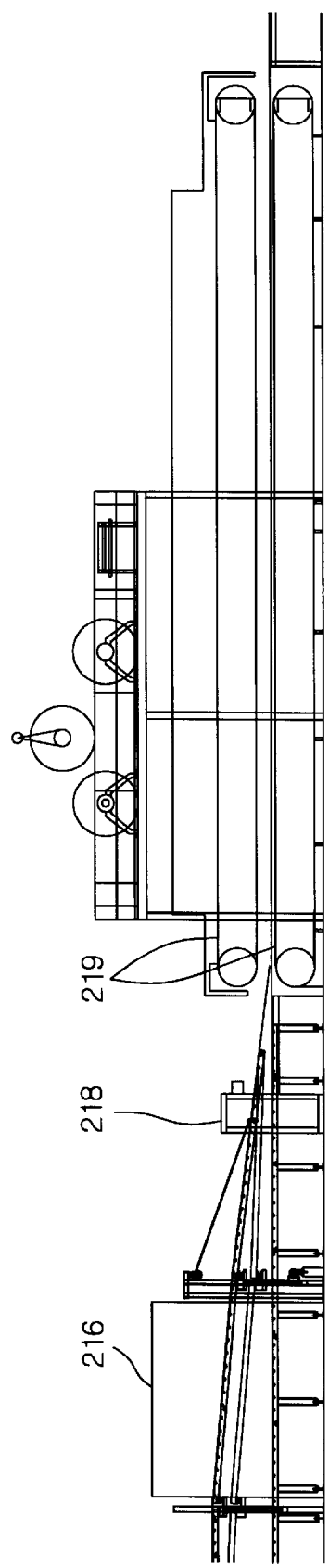
FIG. 10 is an enlarged detail for showing the heater, injector, and conveyor shown in FIG. 2.

FIG. 10 is an enlarged detail for showing the heater 216, injector 218, and conveyor 219 shown in FIG. 2. The heater 216 preheats the inner and outer plate materials 202c and 212c from the roll forming device 214. The injector 218 injects insulated material including a polyurethane between the inner and outer plate materials 202c and 212c. The double conveyor 219 forwards the inner and outer plate materials 202c and 212c from the injector 218 while maintaining a predetermined gap between the inner and outer plate materials 202c and 212c.

Figure 11:
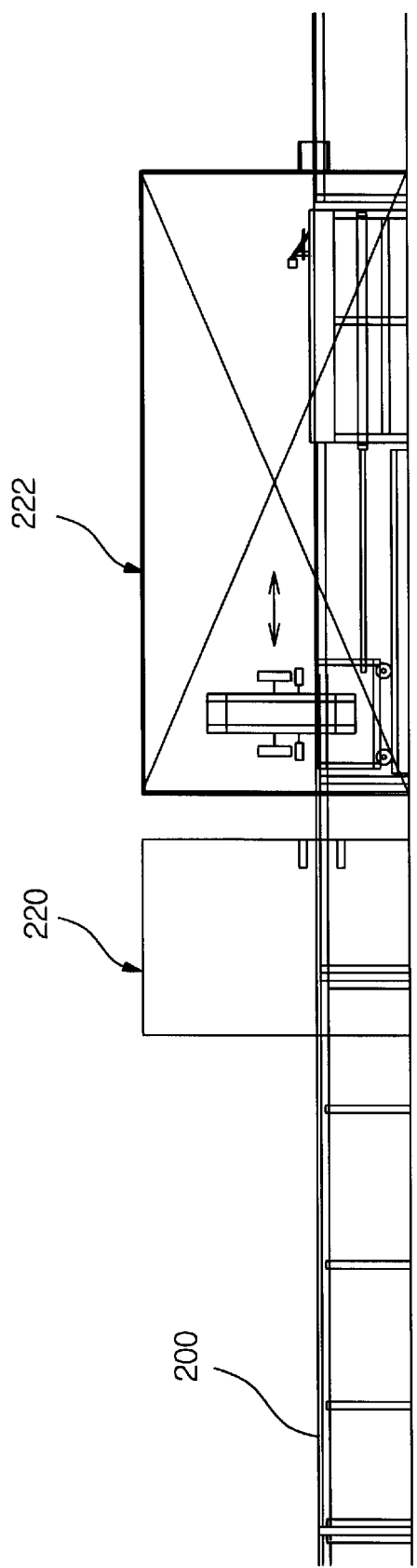
FIG. 11 is an enlarged detail for showing the marking sensor and cutter shown in FIG. 2.

FIG. 11 is an enlarged detail for showing the marking sensor 220 and cutter 222 shown in FIG. 2. The marking sensor 220 senses the mark on the inner plate material 202c from the injector 218 and outputs a sensing signal. The cutter 222 then cuts the inner and outer plate materials 202c and 212c at a fixed size according to the sensing signal sent from the marking sensor 220.

Figure 12:
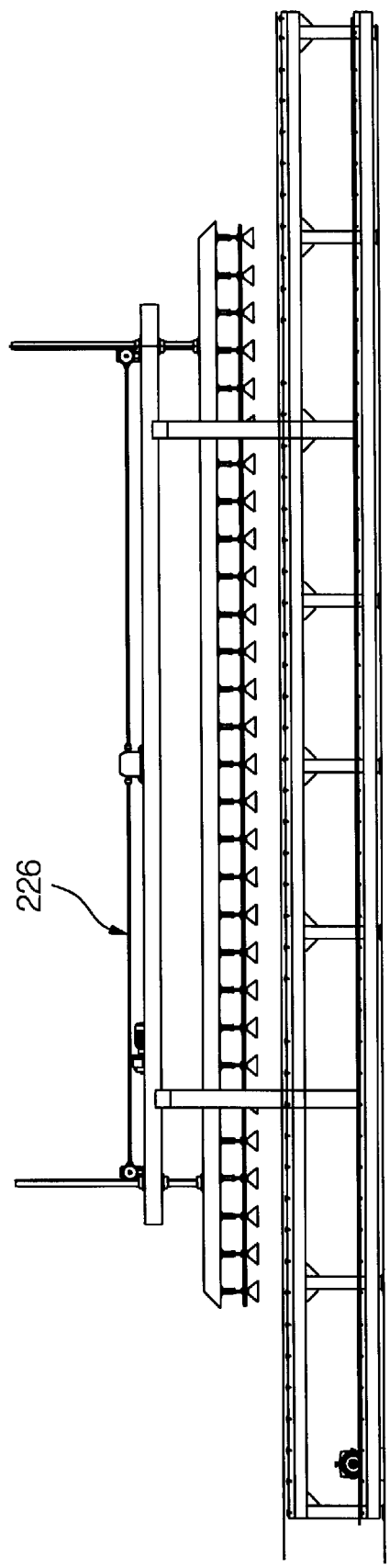
FIG. 12 is an enlarged detail for showing the hoist shown in FIG. 2.
Figure 13:
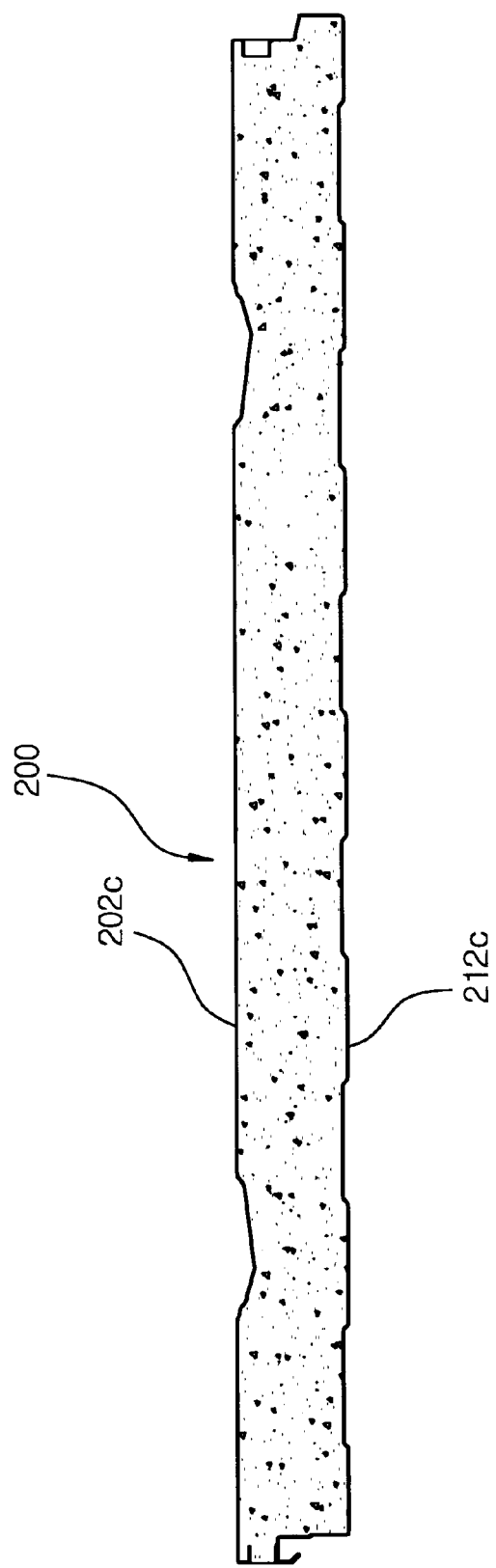
FIG. 13 is an enlarged detail for showing a door panel produced by the present invention.

FIG. 12 is an enlarged detail for showing the hoist 224 shown in FIG. 2. The hoist 224 holds the inner and outer plate materials 202c and 212c from the cutter 222 and loads them on a carrier(not shown). FIG. 13 is an enlarged detail for showing a door panel 200 produced by the present invention.

Figure 14:
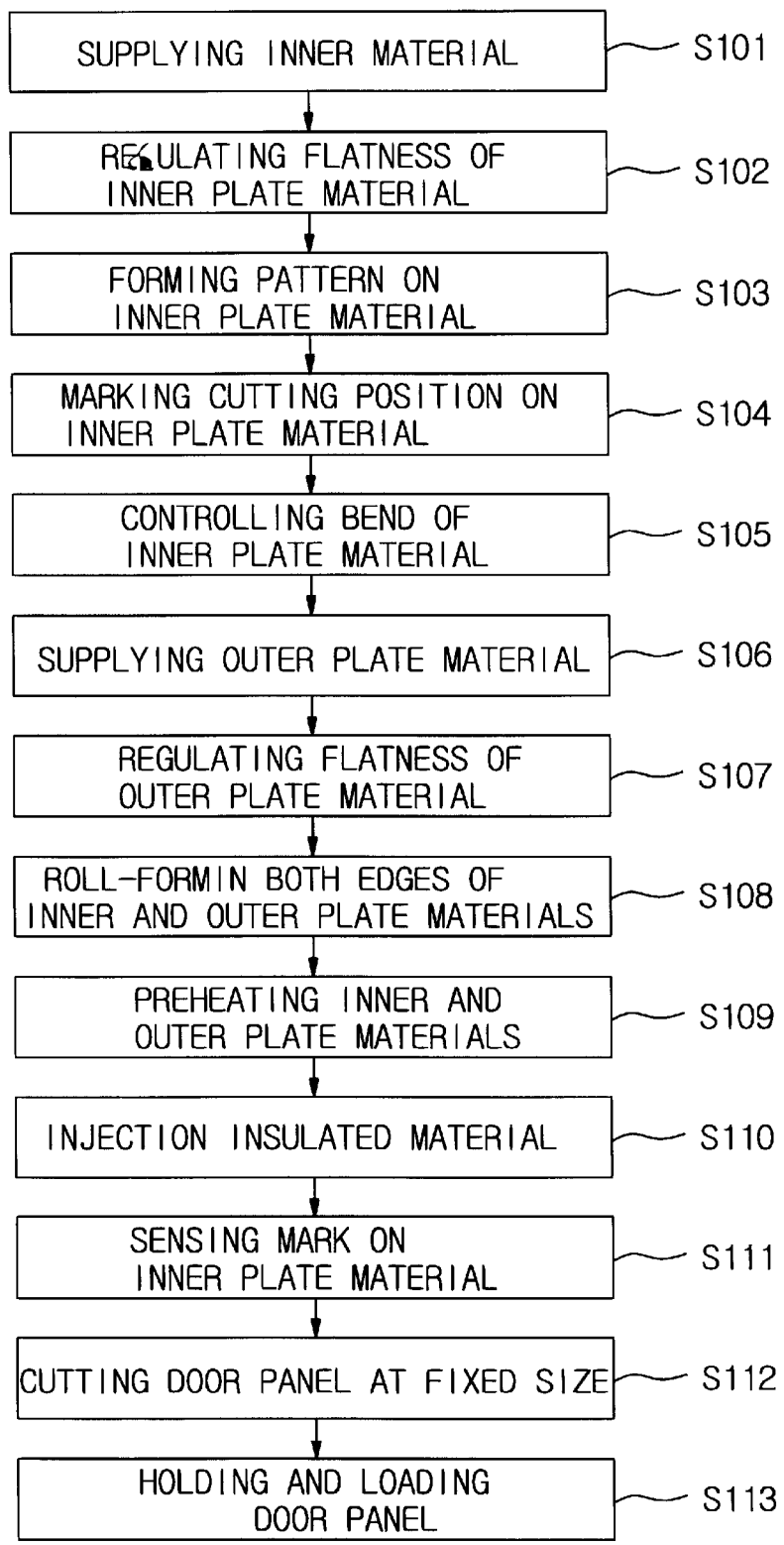
FIG. 14 is a view for illustrating an automatic door panel producing method according to an embodiment of the present invention.

An operation of the automatic door panel producing apparatus and an automatic door panel producing method will be described referring to FIG. 14. FIG. 14 illustrates an automatic door panel producing method according to an embodiment of the present invention.

In step S101, the first uncoiler 202 supplies an inner plate material 202c wound around a first winding member 202a wherein the inner plate material 202c forms an inner surface of a door panel to a first leveler 204. In step S102, the first leveler 204 regulates a flatness of the inner plate material 202c supplied from the first uncoiler 202. The first feeder 205 forwards the inner plate material 202c from the first leveler 204 by a predetermined distance. In step S103, the presser 206 forms a pattern on the inner plate material 202c fed from the first feeder 205.

In step S104, the marking device 208 marks a cutting position on the inner plate material 202c from the presser 206. In step S105, the bend controller 210 controls a bend of the inner plate material 202c from the marking device 208. In step S106, the second uncoiler 212 supplies an outer plate material 212c wound around a second winding member 212a wherein the outer plate material 212c forms an inner surface of a door panel to a second leveler 213.

In step S107, the second leveler 213 regulates a flatness of the outer plate material 212c supplied from the second uncoiler 212. In step S108, the roll forming device 215 folds over both edges of the outer plate materials 212c from the bend controller 210. In step S109, the heater 216 preheats the inner and the outer plate materials 202c and 212c from the roll forming device 214.

In step S110, the injector 218 injects insulated material between the inner and outer plate materials 202c and 212c preheated by the heater 216. The double conveyor 219 forwards the inner and outer plate materials 202c and 212c while maintaining a fixed thickness between the inner and outer plate materials 202c and 212c. In step S111, the marking sensor 220 senses the mark on the inner plate material 202c from the conveyor 219 and outputs a sensing signal to the cutter 222. In step S112, the cutter 222 cuts a door panel 200 to a set size according to the sensing signal sent from the marking sensor 220. In step S113, the hoist 224 holds and loads the door panel 200 from the cutter 222.

As mentioned above, the inner and outer plate materials 202c and 212c are processed while continuously passing through each device so that the door panel shown in FIG. 13 is completed. Therefore, the number of workers and working hours is reduced thereby improve productivity.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. An automatic door panel producing apparatus, said apparatus comprising:

a first uncoiler being wound around an inner plate material and for supplying the wound inner plate material;

a first leveler for regulating a flatness of the inner plate material supplied from the first uncoiler;

a presser for forming a pattern on the inner plate material fed from the first leveler;

a marking device for marking a cutting position on the inner plate material from the presser;

a bend controller for controlling a bend of the inner plate material from the marking device, wherein the bend controller includes a sensing device for sensing a bend of the inner plate material from the marking device, a support member for supporting the inner plate material from the sensor, and a guide member for guiding the inner plate material supported by the support member; wherein the support member includes a supporting body mounted on guiding rollers contacting a bottom surface of the bent inner plate material from the sensing device for supporting the bent inner plate material and a height controller mounted on a bottom surface of the supporting body; and wherein a height of the height controller is adjusted according to a weight of the bent inner plate material supported by the supporting body to control an up-and-down motion of the bent inner plate material;

a second uncoiler being wound around an outer plate material forming an outer surface of the door panel for supplying the wound outer plate material;

a second leveler for regulating a flatness of the outer plate material supplied from the second uncoiler;

a roll forming device for roll-forming both edges of the inner and outer plate materials from the bend controller and second leveler;

a heater for preheating the inner and the outer plate materials from the roll forming device;

an injector for injecting insulated material between the inner and outer plate materials preheated by the heater;

a marking sensor for sensing the mark on the inner plate material from the injector and outputting a sensing signal; and a cutter for cutting the door panel at a fixed size according to the sensing signal from the marking sensor.

2. The automatic door panel producing apparatus as claimed in claim 1, wherein the first uncoiler includes a first winding member being wound around the inner plate material.

3. The automatic door panel producing apparatus as claimed in claim 1, wherein the first uncoiler includes a first urgent rotation preventing section pivotably mounted on a side of the first uncoiler for preventing the inner plate material from suddenly being rotated.

4. The automatic door panel producing apparatus as claimed in claim 1, wherein the first leveler includes a plurality of rollers mounted therein, the inner plate material from the first uncoiler is passed between the rollers.

5. The automatic door panel producing apparatus as claimed in claim 1, wherein the sensing device includes a pair of supporting members placed beside each side of the inner plate material; and a plurality of sensors vertically mounted on opposite surfaces of each of supporting members at regular intervals.

6. The automatic door panel producing apparatus as claimed in claim 1, wherein the guide member includes a first guiding plate hinged to a rear end of the marking device; a first variable supporting body for supporting the first guiding plate; a second guide plate hinged to a front end of the bend controller and facing to the first guiding plate; and a second variable supporting body for supporting the second guiding plate and facing the second variable supporting body.

7. The automatic door panel producing apparatus as claimed in claim 1, wherein the second uncoiler includes a second winding member being wound around the outer plate material.

8. The automatic door panel producing apparatus as claimed in claim 1, wherein the second uncoiler includes a second urgent rotation preventing section pivotably mounted at a side of the second uncoiler for preventing the outer plate material from suddenly being rotated.

9. The automatic door panel producing apparatus as claimed in claim 1, further comprising a first feeder for forwarding the inner plate material from the first leveler by a predetermined distance.

10. The automatic door panel producing apparatus as claimed in claim 1, further comprising a double conveyor for forwarding the inner and outer plate materials while maintaining a predetermined gap between the inner and outer plate materials.

11. The automatic door panel producing apparatus as claimed in claim 1, further comprising a hoist for holding and loading the inner and outer plate materials from the cutter.

\* \* \* \* \*

UNITED STATES PATENT AND TRADEMARK OFFICE
CERTIFICATE OF CORRECTION

PATENT NO.     : 6,467,143 B1
DATED          : October 22, 2002
INVENTOR(S)    : Hong-Guil Kim It is certified that error appears in the above-identified patent and that said Letters Patent is hereby corrected as shown below:

<u>Title page,</u>
Item [73], Assignee, delete "Nam & Nam, Seoul (KR)".

Signed and Sealed this

Seventh Day of March, 2006

JON W. DUDAS
*Director of the United States Patent and Trademark Office*